(12) United States Patent
Glover

(10) Patent No.: US 10,151,137 B2
(45) Date of Patent: Dec. 11, 2018

(54) INSULATED FIBER REINFORCED DOOR PANEL AND METHOD OF MAKING SAME

(71) Applicant: AADG, Inc, Milan, TN (US)

(72) Inventor: Daniel Glover, Franklin, TN (US)

(73) Assignee: AADG, INC., Milan, TN (US)

( * ) Notice: Subject to any disclaimer, the term of this patent is extended or adjusted under 35 U.S.C. 154(b) by 0 days.

(21) Appl. No.: 15/679,273

(22) Filed: Aug. 17, 2017

(65) Prior Publication Data

US 2018/0051508 A1 Feb. 22, 2018

Related U.S. Application Data

(60) Provisional application No. 62/376,673, filed on Aug. 18, 2016, provisional application No. 62/400,297, filed on Sep. 27, 2016.

(51) Int. Cl.
*E06B 3/78* (2006.01)
*E06B 3/70* (2006.01)
(Continued)

(52) U.S. Cl.
CPC ............ *E06B 3/78* (2013.01); *B29C 44/1228* (2013.01); *B29C 44/18* (2013.01); *E06B 3/7015* (2013.01); *E06B 3/822* (2013.01); *B29K 2075/00* (2013.01); *B29K 2105/24* (2013.01); *B29K 2701/12* (2013.01); *B29K 2995/0007* (2013.01); *B29K 2995/0015* (2013.01); *B29L 2031/608* (2013.01); *B29L 2031/724* (2013.01); *E06B 2003/7023* (2013.01); *E06B 2003/7051* (2013.01)

(58) Field of Classification Search
CPC .. E06B 3/7015; E06B 3/78; E06B 2003/7051; E06B 2003/7023; E06B 2003/708; E06B 2003/7063; E06B 2003/7076; E06B 3/822; B29C 44/1228; B29L 2031/724
USPC ....... 52/309.3, 309.7, 309.9, 309.11, 784.15, 52/126.1, 126.2, 126.3, 223.6, 223.13, 52/223.14
See application file for complete search history.

(56) References Cited

U.S. PATENT DOCUMENTS

| 3,177,533 | A | * | 4/1965 | Davis | B62D 33/044 52/204.591 |
|---|---|---|---|---|---|
| 3,950,894 | A | | 4/1976 | DiMaio | |
| 4,091,142 | A | | 5/1978 | Elmore et al. | |
| 4,294,055 | A | | 10/1981 | Andresen | |

(Continued)

FOREIGN PATENT DOCUMENTS

JP        2003146252 A      5/2003

*Primary Examiner* — Patrick J Maestri
(74) *Attorney, Agent, or Firm* — DeLio, Peterson & Curcio, LLC; Peter W. Peterson

(57) ABSTRACT

An insulated door panel comprises a shell having spaced first and second exterior panels and frame members adjacent edges of the panels, a plurality of stiffeners in a shell interior portion extending along a length or width of the panels, and a hardenable insulation material creating a bond between the exterior panels, stiffeners, and frame members in the shell interior portion. The stiffeners comprise a thermally non-conductive fiber reinforced polymer. The hardenable insulation fills substantially all of the space between the adjacent exterior panels, stiffeners, and frame members. The door panel also comprises end cap members composed of thermoplastic polycarbonate material, and has openings therein to receive the ends of the stiffeners.

21 Claims, 5 Drawing Sheets

(51) Int. Cl.
    *B29C 44/12*    (2006.01)
    *E06B 3/82*     (2006.01)
    *B29C 44/18*    (2006.01)
    B29L 31/00     (2006.01)
    B29K 701/12    (2006.01)
    B29K 75/00     (2006.01)
    B29L 31/60     (2006.01)
    B29K 105/24    (2006.01)

(56) References Cited

U.S. PATENT DOCUMENTS

| | | |
|---|---|---|
| 4,686,806 A | 8/1987 | Bennett |
| 4,743,485 A | 5/1988 | Ting |
| 6,568,310 B2 | 5/2003 | Morgan |
| 7,001,656 B2 | 2/2006 | Maignan |
| 8,613,180 B2 * | 12/2013 | Strickland ............... E06B 3/822 |
| | | 49/501 |
| 2004/0003559 A1 | 1/2004 | Minke |
| 2004/0128947 A1 | 7/2004 | Ito et al. |
| 2006/0206977 A1 | 9/2006 | Hammons |
| 2008/0115432 A1 | 5/2008 | Gruppe |
| 2010/0101182 A1 | 4/2010 | Murchie |
| 2010/0257802 A1 | 10/2010 | Strickland et al. |
| 2012/0048487 A1 | 3/2012 | Brewster |
| 2012/0180633 A1 | 7/2012 | Dagher |
| 2015/0217535 A1 * | 8/2015 | Sayyar Bidgoli ....... E04C 5/085 |
| | | 428/174 |
| 2015/0266260 A1 | 9/2015 | Fujioka |
| 2016/0380345 A1 | 12/2016 | Kolak |
| 2017/0022751 A1 | 1/2017 | Wang |
| 2017/0022752 A1 | 1/2017 | Wang |

\* cited by examiner

INSULATED FIBER REINFORCED DOOR PANEL AND METHOD OF MAKING SAME

RELATED APPLICATIONS

This application claims the benefit of U.S. Provisional Patent Application No. 62/376,673, filed Aug. 18, 2016 and U.S. Provisional Patent Application No. 62/400,297, filed Sep. 27, 2016.

BACKGROUND OF THE INVENTION

1. Field of the Invention

The present invention relates to insulated door panels, and in particular, door panels having a cured-in-place internal structure for improving rigidity, thermal efficiency, aesthetics and manufacturability.

2. Description of Related Art

Typical Fiber Reinforced Plastic (FRP) door cores use polyurethanes as the standard core, and mineral core or fire resistant composite cores for fire rated FRP versions. These core materials are very heavy and may also use heavy gage steel components to meet performance requirements and specifications. As a result, the total weight of the door impacts hardware wear and tear, product lifecycle and cost of ownership. These prior door components' weight and finished door opening total weight impacts freight and shipment costs of raw components, as well as finished goods shipment costs. In addition, steel reinforcements, armor plating, and steel end caps are conductive for thermal and electrical energies. Steel is not dimensionally stable under thermal loading, and therefore negatively impacts the energy efficiency of the door opening thermal performance for preventing thermal transfer. These steel components are also vulnerable to corrosion and rusting.

SUMMARY OF THE INVENTION

Bearing in mind the problems and deficiencies of the prior art, it is therefore an object of the present invention to provide a door panel that avoids the use of steel while improving structural integrity, is significantly lower in mass, is thermally efficient and provides an outer appearance free of weld marks.

It is another object of the present invention to provide a door panel which employs non-conducting reinforcement and that may be foamed-in-place with thermal insulation.

It is a further object of the present invention to provide a door panel that eliminates the need for steel end channels used for locating steel or FRP reinforcements, thus reducing the weight of the door while reducing the thermal transfer of the door components.

Yet another object of the present invention is to provide an insulated door panel that employs stiffeners which are also corrosion resistant and provide dimensional stability to the panel under thermal loading.

It is another object of the present invention to provide an insulated panel which may be used as a door.

The above and other objects, which will be apparent to those skilled in the art, are achieved in the present invention which is directed in one aspect to an insulated panel comprising a shell having spaced first and second exterior panels and frame members adjacent edges of the panels. A plurality of stiffeners in a shell interior portion extends along a length or width of the panels. The stiffeners comprise a thermally non-conductive fiber reinforced polymer. A hardenable insulation material is disposed between adjacent exterior panels, stiffeners, and frame members in the shell interior portion. The hardenable insulation provides both thermal insulation and an adhesive to bond the exterior panels, frame members, and stiffeners.

In an embodiment, the frame members have openings corresponding to a cross-section of ends of the stiffeners. The ends of the stiffeners are received within frame member openings at opposite ends of the door shell. The stiffeners may have a substantially circular cross-section. The stiffeners may further be bonded into frame member openings. They may also have an interference fit with frame member openings.

In a further embodiment, the insulation material may chemically bond with the surface of the stiffeners in the shell interior portion. The insulation material may fill substantially all of the space between the adjacent exterior panels, stiffeners, and frame members in the shell interior portion.

Yet another aspect of the present invention provides a method of making an insulated panel which may be used as a door. The method provides first and second exterior panels, and frame members for a door shell. It also provides a plurality of stiffeners comprising a thermally non-conductive fiber reinforced polymer. The first and second exterior panels, frame members, and stiffeners are assembled to make a shell having spaced first and second exterior panels and frame members adjacent edges of the panels. The plurality of stiffeners are disposed in the shell interior portion extending along a length or width of the panels, with the ends of the stiffeners being received in frame members at opposite ends of the door shell. A curable and hardenable insulation material is injected between adjacent exterior panels, stiffeners, and frame members in the shell interior portion. When cured, the insulation provides both thermal insulation and a chemical bond with the surface of the stiffeners.

A further aspect of the present invention provides an insulated panel which may be used as a door. A shell has spaced first and second exterior panels and frame members adjacent edges of the panels. A plurality of stiffeners in a shell interior portion extends along a length or width of the panels, the stiffeners having opposite ends. An end cap member composed of thermoplastic polycarbonate has openings therein to receive the ends of the stiffeners. A thermal insulation material is between adjacent exterior panels, stiffeners, and frame members in the shell interior portion.

In an embodiment, the thermal insulation material is a hardenable insulation material providing both thermal insulation and an adhesive to bond the exterior panels, frame members, and stiffeners. The stiffeners may comprise a thermally non-conductive fiber reinforced polymer having a substantially circular cross-section. The stiffeners may further be bonded into frame member openings. The stiffeners may also have an interference fit with frame member openings.

Still in further embodiments the insulation material chemically bonds with the surface of the stiffeners in the shell interior portion. The insulation material may fill substantially all of the space between the adjacent exterior panels, stiffeners, and frame members in the shell interior portion.

Another aspect of the present invention is directed to a method of making an insulated panel which may be used as a door. The method provides first and second exterior panels, and frame members for a door shell. It further provides a plurality of stiffeners, and end cap members composed of thermoplastic polycarbonate having openings therein to receive the ends of the stiffeners. The ends of the stiffeners are secured into the openings in the end cap members. The first and second exterior panels, frame members, and stiffeners with ends secured in the at least one end cap member are assembled to make a shell. The shell has spaced first and second exterior panels and frame members adjacent edges of the panels, with the plurality of stiffeners being disposed in the shell interior portion extending along a length or width of the panels. The ends of the stiffeners are received in the end caps positioned adjacent frame members at opposite ends of the door shell. An insulation material is disposed between adjacent exterior panels, stiffeners, and frame members in the shell interior portion.

In one embodiment, the method may include injecting a curable and hardenable insulation material between the adjacent exterior panels, stiffeners, and frame members in the shell interior portion. This insulation material provides both thermal insulation and an adhesive to bond the exterior panels, frame members, and stiffeners.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF EMBODIMENT(S)

Figure 1:
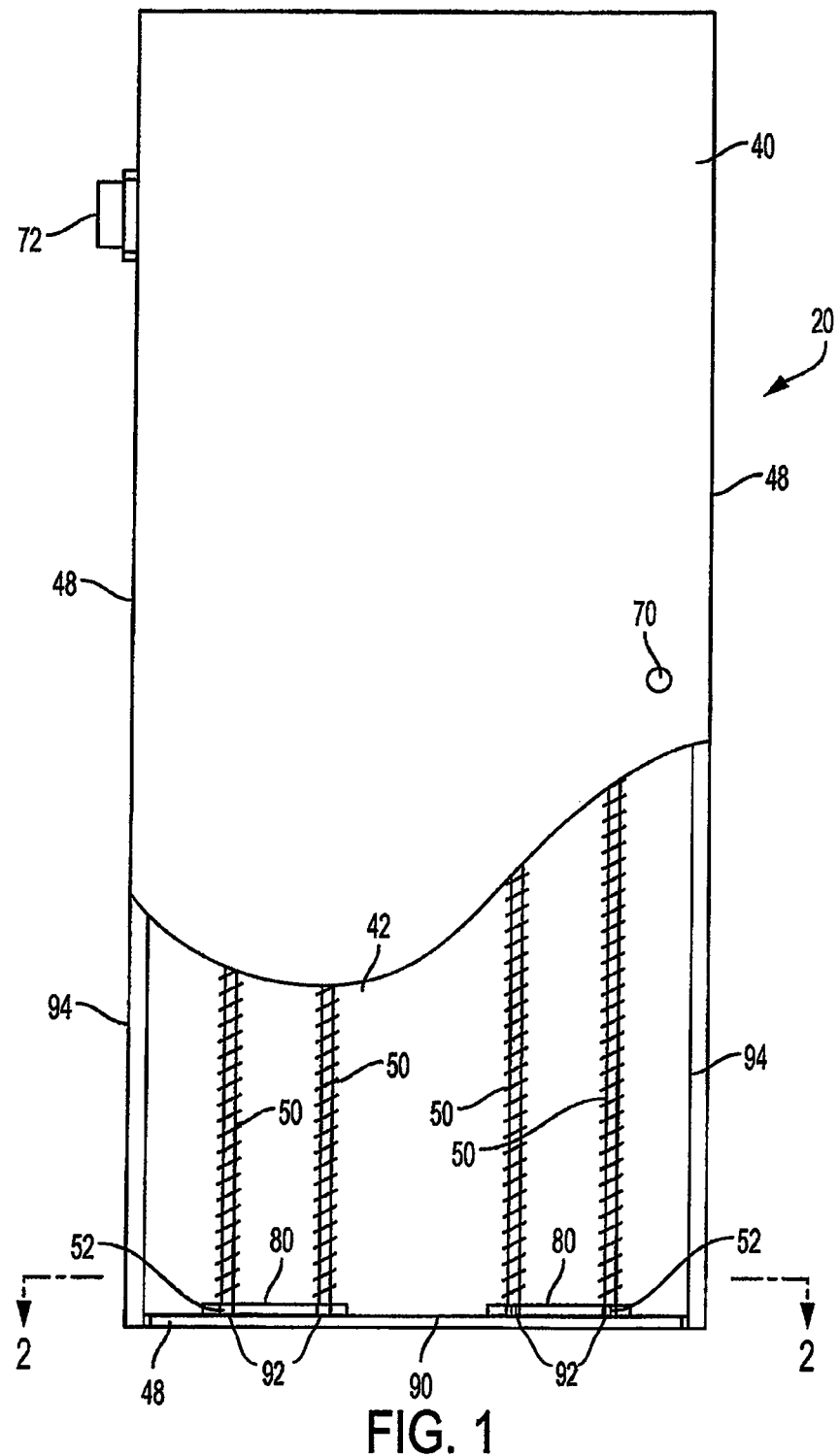
FIG. 1 is a cutaway front elevational view with partial cutaway of an embodiment of the insulated reinforced door panel according to the present invention.
Figure 2:
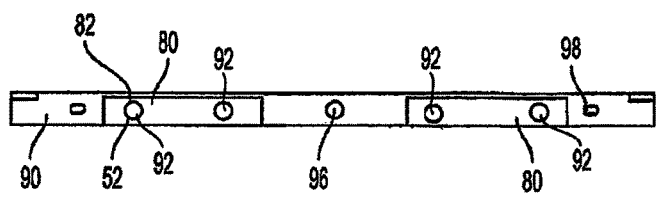
FIG. 2 is a cross section of the lower frame members of the insulated reinforced door panel of FIG. 1 along line 2-2.

In describing the preferred embodiment of the present invention, reference will be made herein to FIGS. 1-12 of the drawings in which like numerals refer to like features of the invention. Reference will also be made to the general direction of orientation of the door panel 20 of the invention.

FIGS. 1, 2, 3, 4 and 5 show an embodiment of the insulated reinforced door panel 20 of the present invention. The door shell includes an inner panel 40 and a spaced outer panel 42 opposite the inner panel. The inner panel 40 and outer panel 42 form the exterior panels of the door, and may also be referred to as the door skin. The exterior panels may be made of any suitable sheet material, for example a metal or alloy such as about 14, 16, 18 or 20 gauge steel, a fiber reinforced plastic (FRP), wood, or composite. The exterior panels may be flat or embossed. The insulated door 20 includes door edges 48 extending between the periphery of the inner and outer panels. Upper and lower door edges 48 are formed by elongated upper and lower frame members 90, which may have a "U" or "C" channel cross-section, to which the inner and outer panels 40, 42 are welded or otherwise adhered. Side door edges 48 also have a "U" or "C" cross-section 94, which may be formed by folding the side edges of outer panel 42 in a tab and slot construction. There may be provided in the frame members one or more slots or openings 98 for hanging panel 20 during the manufacturing process, such as when painting, and one or more slots or openings 96 for injecting foam insulation (FIGS. 2 and 7) (discussed further below). A preparation opening 70 for a lock and/or door handle may be provided, along with hinges 72 (FIGS. 1 and 6) to secure the door to a door opening (not shown). Although the panel 20 is shown in use as a door, alternatively, the present invention may be used as a wall or other structural panel, without the door hardware.

In the interior portion between the inner and outer exterior panels a plurality of spaced-apart elongated structural stiffeners 50 extend substantially between the door edges. Although stiffeners 50 are shown extending vertically from the top to the bottom edges of the door, they may extend horizontally from one side to the other, or in any other direction. The stiffeners may be made of a fiber reinforced polymer (FRP), such as glass fiber reinforced polymer (GFRP), aramid fiber reinforced polymer (AFRP), carbon fiber reinforced polymer (CFRP), or the like. The drawings show a FRP rod 50 which has glass fibers spirally wrapped 54 about the exterior (FIGS. 1, 5, 6, and 11). The FRP may be anisotropic or isotropic in mechanical properties, and generally has significantly higher tensile strength and lower modulus of elasticity than steel. As a result, a stiffener made of FRP may be made of comparable or greater strength than steel, with significantly lower mass. The FRP stiffener may be of any cross-section desired, such as circular or rectangular.

Figure 4:
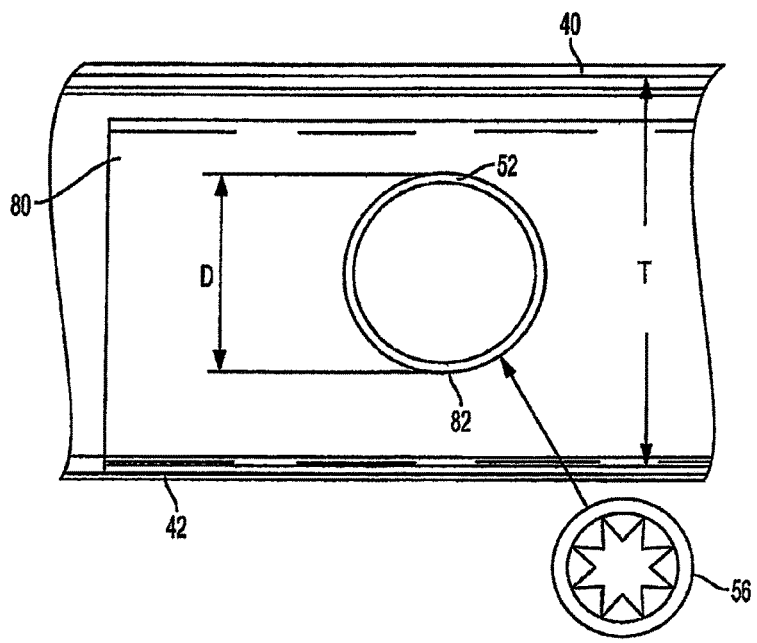
FIG. 4 is a close-up of the cross section of a stiffener fitted into the opening in the lower channel of the insulated reinforced door panel of FIG. 2.
Figure 5:
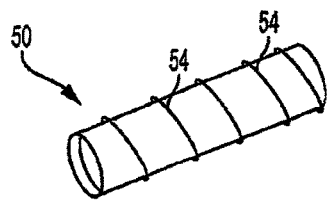
FIG. 5 is a perspective view of a FRP stiffener used in the door panel of FIG. 1.
Figure 3:
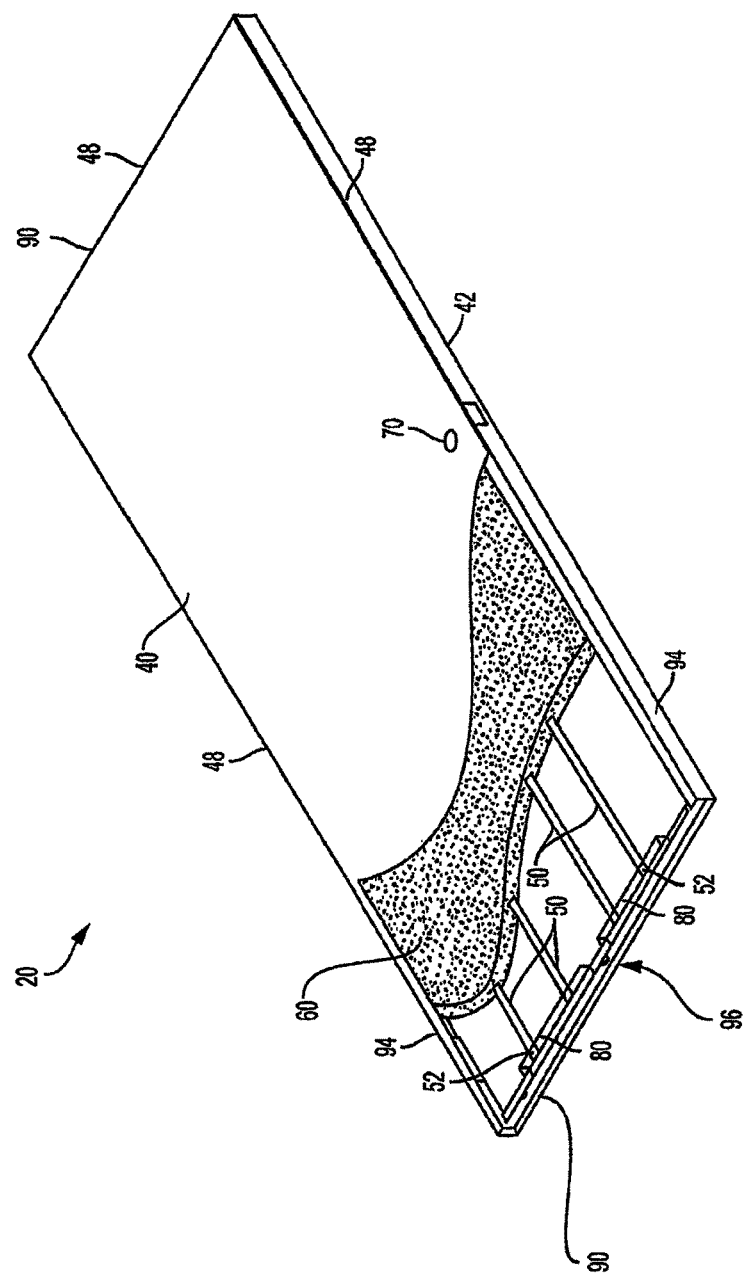
FIG. 3 is a rear perspective view with partial cutaway of the insulated reinforced door panel of FIG. 1.
Figure 6:
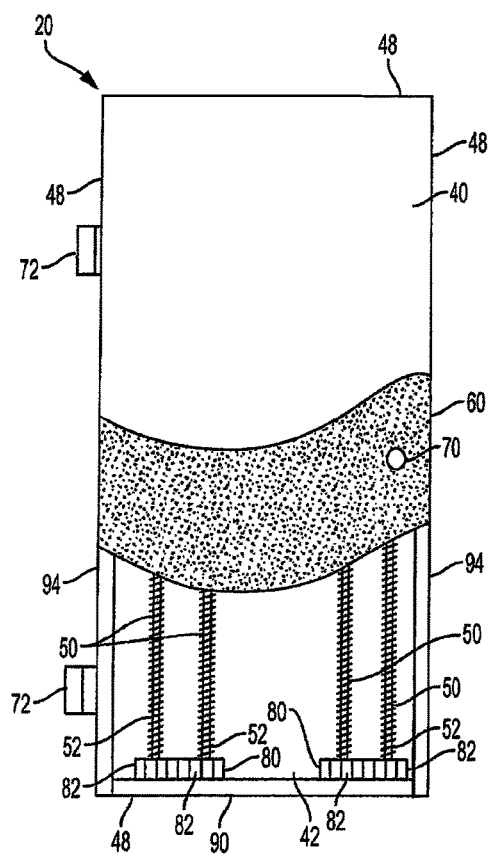
FIG. 6 is a front elevational view with partial cutaway of an embodiment of the door panel according to the present invention.
Figure 8:
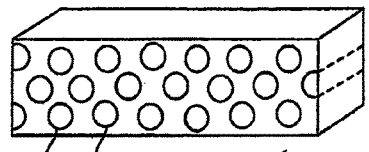
FIG. 8 is a perspective view of the honeycomb polycarbonate end cap used in the door panel embodiment of FIG. 6.
Figure 9:
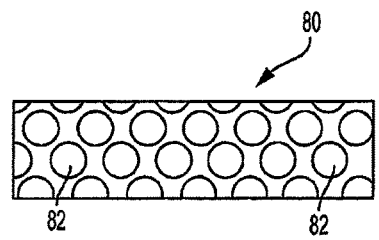
FIG. 9 is an end view of the honeycomb polycarbonate end cap used in the door panel of FIG. 6.
Figure 10:
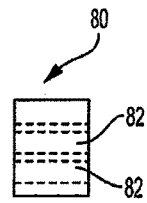
FIG. 10 is a side view of the honeycomb polycarbonate end cap used in the door panel of FIG. 6.
Figure 7:
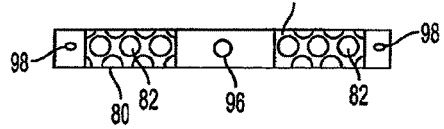
FIG. 7 is an end view of the lower frame member of the door panel embodiment of FIG. 6.
Figure 11:
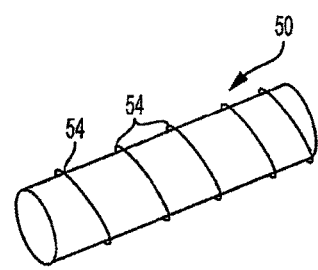
FIG. 11 is a perspective view of a FRP stiffener used in the door panel of FIG. 6.
Figure 12:
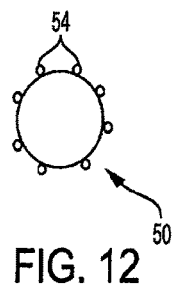
FIG. 12 is a cross-sectional view of a FRP stiffener used in the door panel of FIG. 6.

As shown in FIGS. 1, 4 and 5, and in the alternate embodiment shown in FIGS. 6, 11 and 12, the FRP stiffener 50 is of a substantially circular configuration. The diameter D of the stiffeners may typically be in the range of 0.25 in to 0.75 in., for example 0.375 in. or 0.5 in. The stiffener diameter D may typically be in the range of 20% to 50% of the interior door thickness T (FIG. 4), and may be in the range of 20% to 30% of T. The stiffeners 50 should be provided in number and size to provide sufficient structural integrity to maintain the desired strength of the door. Stiffeners 50 may be sized and spaced from inner and outer door panels 40, 42, so a gap exists and there is no direct contact between the mid-portions of the stiffeners between ends 52 and the inner surface of the door skins. This provides a minimal thermally conductive bridge through the door thickness.

In the alternative, the stiffeners may be made of another suitable structural material, for example a metal or alloy such as hollow steel tube of 0.40 in (10 mm) thickness. The tube may be of any cross-section desired, such as rectangular or circular. A square cross-section may be used for stiffener 50 and the square stiffener may be oriented in a "diamond" or diagonal configuration, with one pair of opposite corners being oriented toward to the inner and outer panels 40, 42 and the other pair of opposite corners being oriented parallel to the inner and outer panels. The sides are non-parallel with those panels, in this case at a 45° angle with respect thereto.

To hold the stiffeners 50 in place within the door interior, the ends 52 are secured to end caps 80, which are themselves secured to frame members 90 at the top and bottom door edges 48, and may be notched for receiving the ends of stiffeners 50. The end channels 80 may be composed of a thermoplastic polymeric material, such as a polycarbonate, or of any other suitable material such as 14, 16, 18, or 20 gauge steel. As shown in FIGS. 7-10, the thermoplastic polymeric end cap 80 is formed with a honeycomb pattern having a plurality of regularly spaced, patterned openings or holes 82 between flat wall portions, which openings may be molded in during forming of the thermoplastic, or otherwise formed through the thickness of the polymeric sheet. The openings 82 may have any desired cross-section, such as circular, square, rectangular or polygonal. The polymeric end cap 80 is both thermally and electrically non-conductive. The sheet dimensions may be sized to fill substantially the entire thickness between the panel skins, or may be of lesser or greater thickness than the interior space formed by the panel skins.

Figure 13:
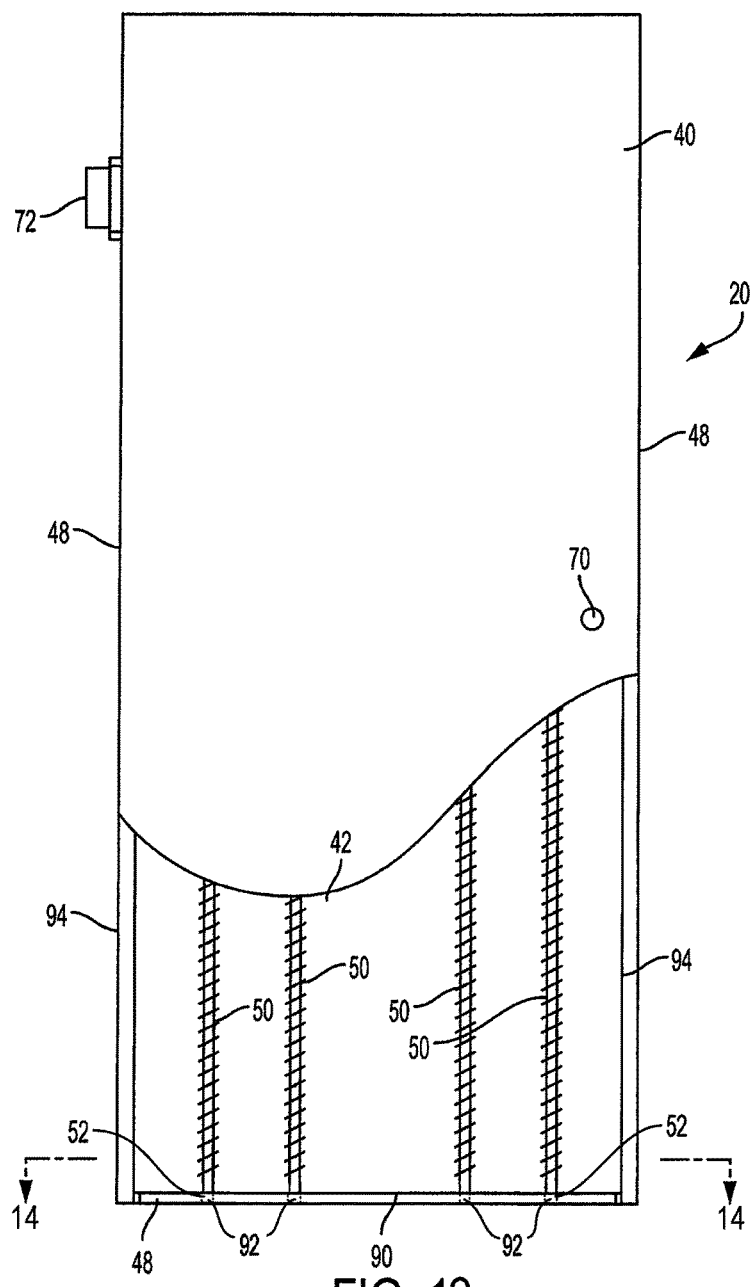
FIG. 13 is a cutaway front elevational view with partial cutaway of an embodiment of the insulated reinforced door panel of FIG. 1 excluding end caps, according to the present invention.
Figure 14:
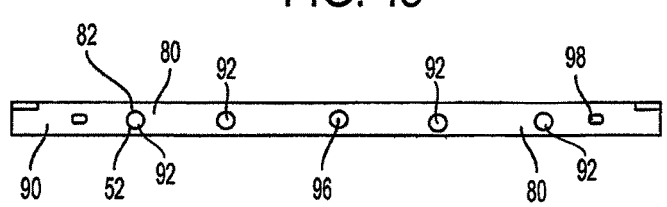
FIG. 14 is a cross section of the lower frame members of the insulated reinforced door panel of FIG. 13 along line 14-14.

Stiffeners 50 may be secured to frame members directly via openings 92 in the frame members 90 at opposite ends of the door shell, the openings corresponding to a cross-section of the ends of the stiffeners (FIGS. 13 and 14). In another embodiment shown the stiffeners 50 are bonded into the openings 82 in the end cap 80 that correspond in shape and size to the stiffener ends 52 (FIGS. 2 and 4; alternate embodiment FIGS. 7-10), for example, with epoxy. Alternatively, the stiffener ends may be mechanically locked in position by a tight sliding interference fit into the end cap openings 82. End cap openings 82 serve as relief slots for the stiffener ends 52. Other bonding methods and materials may alternatively or additionally be used to secure the stiffener ends 52, including but not limited to adhesives and mechanical fasteners, such as a lock washer 56 in opening 82 (FIG. 4). Both ends of the stiffeners are secured to the end cap members 80, and similar end cap members 80 (not shown) are provided at the top end of door panel 20 secured to top frame 90 at top edge 48 between door skins 40, 42.

A curable and hardenable insulation material 60 is disposed between adjacent stiffeners and fills the interior cavity between the inner and outer panels 40, 42. The insulation material may be expanded foam such as BASF 21B density polyurethane expanding foam, using P50341 resin and Honeywell HFO blowing agent. The foam when cured acts to provide thermal insulation through the thickness of the panel. Additionally, the cured foam adheres to and acts to lock the mid-sections of stiffeners 50 in place, between the ends 52, to prevent movement of the stiffeners from side-to-side, in the directions of the panel side frame members 94. The FRP stiffener composition may also be selected so that the insulation material 60 when cured chemically bonds to the FRP stiffener surface, so that the stiffeners and insulation are integral with one another. The use of FRP for the stiffeners also improves the thermal insulation of the door, since the FRP has more thermal insulation value than, and is more thermally and electrically non-conductive than stiffeners made of steel or other metals. Additionally, the FRP stiffeners are corrosion resistant and provide dimensional stability to the panel under thermal loading. No additional liners or other structural members are required between the ends of the stiffeners. The cured-in-place structural combination of the foam and stiffeners eliminates the need to have the stiffeners, in the mid-portions between the ends 52, welded or otherwise separately adhered to the door skins to prevent such side-to-side movement.

In a method for making the insulated reinforced door panel of the invention, the ends 52 of a plurality of the stiffeners 50 are slid tightly into openings 82 of polymeric end cap members 80 to lock them in place mechanically. The stiffeners may alternatively be interference fitted or otherwise bonded at their ends 52 to end caps 80. The end caps 80 are secured to the upper and lower frame members 90. The opposite ends of upper and lower frame members 90 are attached to side frame members 94 formed by folding side edges of outer panel 42, and inner panel 40 is secured over and covering the frame members 90, 94 and internal stiffeners 50. The structural members and door skins may be assembled in any desired sequence.

Flowable foam is then injected into the cavity of the door between the frame members, stiffeners and outer door skins. The injection may be made through foam slot(s) 96 at the end of the door shell. Where the stiffeners contact the inside surfaces of panels 40, 42, a foam inlet will be provided between each pair of stiffeners, or between a stiffener and the door side frame member. The flowable foam may be a foam material that expands upon contact with the atmospheric air or alternately a two-part foam that expands upon mixing the two parts together. The stiffeners 50 may include openings or slots along the stiffener length which allow the expanding foam to flow from one cavity to an adjacent cavity. The flowable foam then hardens and is bonded to the inside surfaces of panels 40, 42, frame members 90, 94, and stiffeners 50. The foam acts both as thermal insulation material and bonds to the door skin and stiffeners as an adhesive or direct chemical bond.

Thus, the present invention provides an insulated door panel whose structural framework may be made of fiber reinforced polymer. Bearing in mind the problems and deficiencies of the prior art, it is therefore an object of the present invention to provide a foam-in-place and vertical FRP. The reinforced core with thermoplastic end caps eliminates the need for steel end channels used for locating steel stiffeners and the steel channels used for FRP reinforcements, thus reducing the weight of the door. The thermoplastic end channels and FRP reinforced rods also reduce the thermal transfer of the door components. These thermoplastic end channels and FRP reinforced rods can be used in hollow metal, wood, and FRP door designs reducing the number of core types. The FRP may be anisotropic or isotropic in mechanical properties, and generally has significantly higher tensile strength and lower modulus of elasticity than steel. As a result, a stiffener made of FRP may be made of comparable or greater strength than steel, with significantly lower mass. FRP stiffeners are also corrosion resistant and provide dimensional stability to the panel under thermal loading. The insulated door panel of the present invention improves structural integrity, is thermally efficient and provides an outer appearance free of weld marks.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An insulated panel which may be used as a door comprising:
   a shell having spaced first and second exterior panels and frame members adjacent edges of the panels, with upper and lower frame members having openings therein forming upper and lower edges of the panel, respectively;
   a plurality of stiffeners in a shell interior portion extending along a length of the panels, the stiffeners comprising a thermally non-conductive fiber reinforced polymer having opposite ends; and
   a hardenable insulation material between adjacent exterior panels, stiffeners and frame members in the shell interior portion, the hardenable insulation providing both thermal insulation and an adhesive to bond the exterior panels, frame members and stiffeners;
   wherein the upper and lower frame members openings correspond to a cross section of ends of the stiffeners, the ends of the stiffeners being bonded or interference fit within frame member openings at opposite ends of the panel and not extending beyond upper and lower edges of the frame members.

2. The panel of claim 1 wherein the stiffeners have a substantially circular cross-section.

3. The panel of claim 1 wherein the insulation material chemically bonds with the surface of the stiffeners in the shell interior portion.

4. The panel of claim 1 wherein the insulation material fills substantially all of the space between the adjacent exterior panels, stiffeners and frame members in the shell interior portion.

5. A method of making an insulated panel which may be used as a door comprising:
   providing first and second exterior panels for a door shell;
   providing frame members for the door shell, the frame members having openings therein;
   providing a plurality of stiffeners comprising a thermally non-conductive fiber reinforced polymer having opposite ends, the ends of the plurality of stiffeners having cross sections corresponding to the frame member openings;
   assembling the first and second exterior panels, frame members and stiffeners to make a shell having spaced first and second exterior panels and frame members adjacent edges of the panels, the plurality of stiffeners being disposed in the shell interior portion extending along a length of the panels, with ends of the stiffeners being received in frame members at opposite ends of the door shell;
   bonding or fitting with an interference fit the ends of the plurality of stiffeners within the frame member openings at opposite ends of the panel so that the ends of the plurality of stiffeners do not extend beyond upper and lower edges of the frame members; and
   injecting a curable and hardenable insulation material between adjacent exterior panels, stiffeners and frame members in the shell interior portion, the insulation when cured providing both thermal insulation and a chemical bond with the surface of the stiffeners.

6. The method of claim 5 wherein the stiffeners have a substantially circular cross-section.

7. The method of claim 5 including filling substantially all of the space between the adjacent exterior panels, stiffeners and frame members in the shell interior portion with the insulation material.

8. An insulated panel which may be used as a door comprising:
   a shell having spaced first and second exterior panels and frame members adjacent edges of the panels;
   a plurality of stiffeners in a shell interior portion extending along a length or width of the panels, the stiffeners having opposite ends; and
   an end cap member composed of thermoplastic polycarbonate having openings therein to receive the ends of the stiffeners, the end cap member being secured to sides of the frame members on the interior portion of the shell; and
   a thermal insulation material between adjacent exterior panels, stiffeners and frame members in the shell interior portion.

9. The panel of claim 8 wherein the thermal insulation material is a hardenable insulation material providing both thermal insulation and an adhesive to bond the exterior panels, frame members and stiffeners.

10. The panel of claim 8 wherein the stiffeners comprise a thermally non-conductive fiber reinforced polymer having a substantially circular cross-section.

11. The panel of claim 8 wherein the stiffeners are bonded into frame member openings.

12. The panel of claim 8 wherein the stiffeners have an interference fit with frame member openings.

13. The panel of claim 8 wherein the insulation material chemically bonds with the surface of the stiffeners in the shell interior portion.

14. The panel of claim 8 wherein the insulation material fills substantially all of the space between the adjacent exterior panels, stiffeners and frame members in the shell interior portion.

15. A method of making an insulated panel which may be used as a door comprising:
   providing a door shell having an interior portion;
   providing first and second exterior panels for the door shell;
   providing frame members for the door shell;
   providing a plurality of stiffeners;
   providing end cap members composed of thermoplastic polycarbonate having openings therein to receive the ends of the stiffeners, the end cap members being secured to sides of the frame members on the interior portion of the shell;
   securing ends of the stiffeners into the openings in the end cap members;
   assembling the first and second exterior panels, frame members and stiffeners with ends secured in the at least one end cap member to make a shell having spaced first and second exterior panels and frame members adjacent edges of the panels, the plurality of stiffeners being disposed in the shell interior portion extending along a length or width of the panels, with ends of the stiffeners being received in the end caps positioned adjacent frame members at opposite ends of the door shell; and disposing an insulation material between adjacent exterior panels, stiffeners and frame members in the shell interior portion.

16. The method of claim 15 including injecting a curable and hardenable insulation material between adjacent exterior panels, stiffeners and frame members in the shell interior portion to provide both thermal insulation and an adhesive to bond the exterior panels, frame members and stiffeners.

17. The method of claim 15 wherein the stiffeners comprise a thermally non-conductive fiber reinforced polymer having a substantially circular cross-section.

18. The method of claim 15 including bonding the stiffeners into the end cap member openings.

19. The method of claim 15 including fitting the stiffeners into the end cap member openings with an interference fit.

20. The method of claim 15 including chemically bonding the insulation material with the surface of the stiffeners in the shell interior portion.

21. The method of claim 15 including filling substantially all of the space between the adjacent exterior panels, stiffeners and frame members in the shell interior portion with the insulation material.

\* \* \* \* \*